(12) United States Patent
Wang et al.

(10) Patent No.: US 9,303,729 B2
(45) Date of Patent: Apr. 5, 2016

(54) PLANETARY GEARBOX AND PROCESS FOR ASSEMBLING THE SAME

(71) Applicant: Johnson Electric S.A., Murten (CH)

(72) Inventors: Xiaohui Wang, Shenzhen (CN); Shijie Huang, Shenzhen (CN); Wanhor Looi, Hong Kong (CN)

(73) Assignee: JOHNSON ELECTRIC S.A., Murten (CH)

( * ) Notice: Subject to any disclaimer, the term of this patent is extended or adjusted under 35 U.S.C. 154(b) by 138 days.

(21) Appl. No.: 14/064,111

(22) Filed: Oct. 25, 2013

(65) Prior Publication Data

US 2014/0135166 A1    May 15, 2014

(30) Foreign Application Priority Data

Oct. 26, 2012   (CN) .......................... 2012 1 0417344

(51) Int. Cl.
| | |
|---|---|
| *F16H 1/46* | (2006.01) |
| *F16H 57/023* | (2012.01) |
| *F16H 57/00* | (2012.01) |
| *F16H 57/033* | (2012.01) |

(52) U.S. Cl.
CPC ................ *F16H 1/46* (2013.01); *F16H 57/023* (2013.01); *F16H 57/033* (2013.01); *F16H 2057/005* (2013.01); *Y10T 29/49464* (2015.01)

(58) Field of Classification Search
None
See application file for complete search history.

(56) References Cited

U.S. PATENT DOCUMENTS

| | | | | |
|---|---|---|---|---|
| 4,784,017 | A * | 11/1988 | Johnshoy ........................... | 475/6 |
| 8,376,901 | B2 * | 2/2013 | Riester et al. ................. | 475/331 |
| 8,727,931 | B2 * | 5/2014 | Hafner ........................... | 475/299 |
| 8,961,362 | B2 * | 2/2015 | Fox et al. ...................... | 475/337 |
| 2009/0082168 | A1 * | 3/2009 | Yen ........................... | F16H 1/46 |
| | | | | 475/337 |
| 2013/0231210 | A1 * | 9/2013 | Terauchi et al. .............. | 475/159 |

FOREIGN PATENT DOCUMENTS

| | | |
|---|---|---|
| JP | H029353 U | 1/1990 |
| WO | 2011123959 | * 10/2011 |
| WO | WO2012070205 | * 5/2012 |

* cited by examiner

*Primary Examiner* — Mark Manley
(74) *Attorney, Agent, or Firm* — Muncy, Geissler, Olds & Lowe, P.C.

(57) ABSTRACT

A gearbox assembly (10) configured for easy to assembling comprises a plurality of gears (30) configured to spin within a plurality of inner gear rings (20, 22). Fixing mechanisms (40) are axially inserted from the input side (12) of the gearbox, thereby allowing for a connector (90) to be attached to the output shaft (62) of the gearbox prior to gearbox assembling.

18 Claims, 11 Drawing Sheets

PLANETARY GEARBOX AND PROCESS FOR ASSEMBLING THE SAME

CROSS REFERENCE TO RELATED APPLICATION(S)

This application claims the benefit of Chinese patent application serial no. 201210417344.3, which was filed on Oct. 26, 2012. The entire content of the aforementioned patent application is hereby incorporated by reference for all purposes.

BACKGROUND

Gearbox assemblies or mechanisms are widely used to transfer power to an output shaft in many types of electric motors or other rotary devices. For example, gearboxes may be used to change the rotational speed or output torque of an electric motor to be suited for a particular application.

Figure 1A:
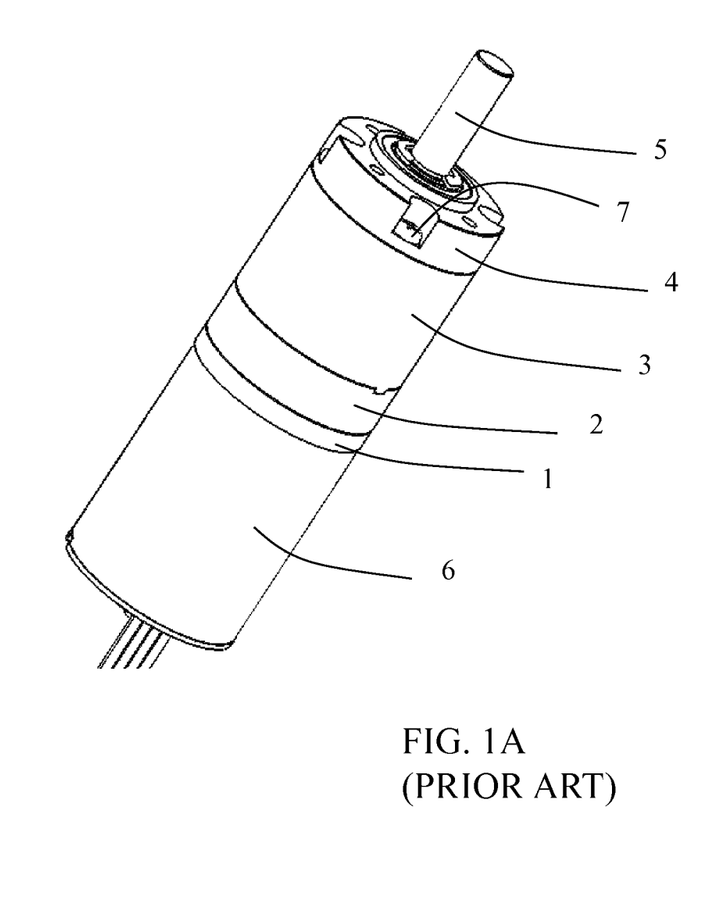
FIGS. 1A-1B illustrate example electric motor and gearbox assemblies.
Figure 1B:
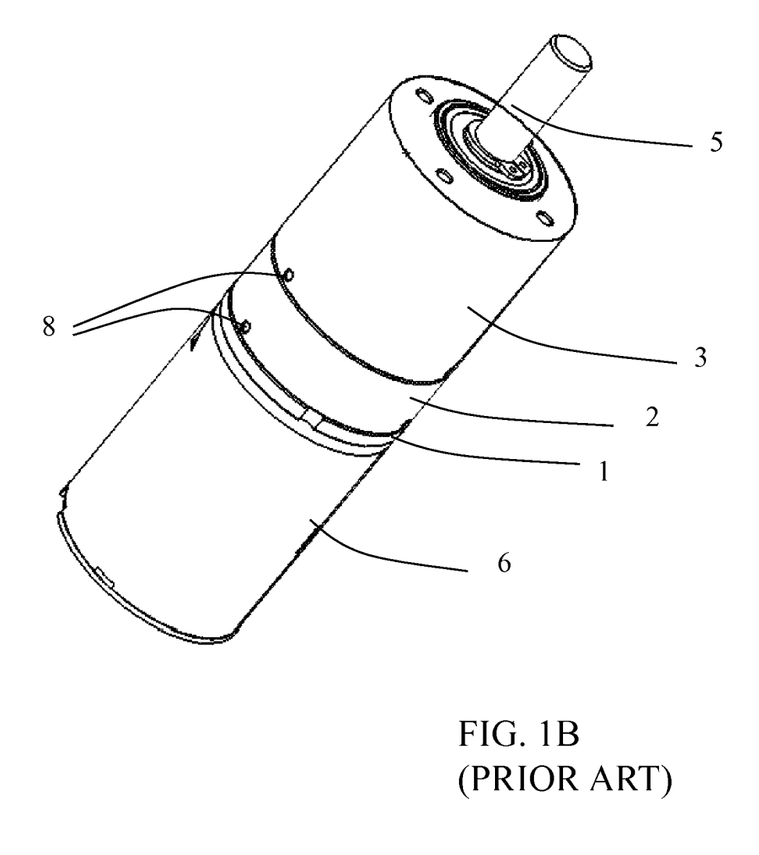

FIGS. 1A and 1B illustrate examples of different designs for motor gearbox mechanisms. For example, FIG. 1A illustrates a motor and gearbox assembly, comprising a mounting plate 1, one or more inner gear rings (such as a first inner gear ring 2 and a second inner gear ring 3), and a cover 4. One or more gear groups may be configured to rotate within the inner gear rings 2 and 3. The rotations of the gear groups drive an output shaft 5. The mounting plate 1 attaches the gearbox to an electric motor 6. One or more fasteners 7 (e.g., fixing screws, bolts, or pins) are inserted from the output end of the gearbox, and extend through the cover 4, first and second inner gear rings 2 and 3, and mounting plate 1.

A connection to a free end of the output shaft 5 of the motor is used to transfer the rotation of the output shaft to an application, e.g., a fan, wheel, gear, etc. In many applications, in order to avoid damaging bearings associated with the output shaft 5, the connection to the output shaft 5 should be installed first during assembly. However, installation of the connection to the output shaft 5 may interfere with the installation of fasteners 7.

FIG. 1B illustrates another approach for mounting a gearbox to a motor, using a plurality of radial pins 8 to attach gear rings 2 and 3, and to attach the gearbox to the motor 6. However, such a design may be disadvantageous for use in high vibration environments, as vibrations of the device may cause the pins to come out.

Thus, there exists a need for a gearbox assembly that is easy to assemble. In addition, there exists a need for a gearbox assembly with reduced noise and reliability in high vibration environments.

SUMMARY

Some embodiments are directed at an easy to assemble gearbox assembly. In some embodiments, the gearbox assembly comprises a plurality of inner gear rings and a plurality of gear groups configured to spin within the plurality of inner gear rings, wherein the plurality of gear groups transfer power from an input end of the gearbox assembly to an output shaft at an output end of the gearbox assembly. In some embodiments, a gear group comprises a solar gear and a plurality of planetary gears, wherein the planetary gears mesh with the solar gear and the teeth of an inner gear ring. Power may be transferred between gear groups using a spinning gear frame attached to the planetary gears of one gear group and the solar gear of the next gear group. An output shaft may be connected to the gear group closest to the output end of the gearbox, and may pass through one or more bearings mounted in a bearing housing and be attached to a connector component. A plurality of fixing members may be used to fix the plurality of inner gear rings together, wherein the fixing members are inserted into the gearbox assembly from the input end, such that the connector component may be mounted to the output shaft prior to gearbox assembly without interfering with the insertion of the fixing members. The assembled gearbox may then be attached to an electric motor or other source of power.

BRIEF DESCRIPTION OF THE DRAWINGS

The drawings illustrate the design and utility of embodiments, in which similar elements are referred to by common reference numerals. These drawings are not necessarily drawn to scale. In order to better appreciate how the above-recited and other advantages and objects are obtained, a more particular description of the embodiments will be rendered which are illustrated in the accompanying drawings. These drawings depict only exemplary embodiments and are not therefore to be considered limiting of the scope of the claims.

DETAILED DESCRIPTION

Various features are described hereinafter with reference to the figures. It shall be noted that the figures are not drawn to scale, and that the elements of similar structures or functions are represented by like reference numerals throughout the figures. It shall also be noted that the figures are only intended to facilitate the description of the features for illustration and explanation purposes, unless otherwise specifically recited in one or more specific embodiments or claimed in one or more specific claims. The drawings figures and various embodiments described herein are not intended as an exhaustive illustration or description of various other embodiments or as a limitation on the scope of the claims or the scope of some other embodiments that are apparent to one of ordinary skills in the art in view of the embodiments described in the Application. In addition, an illustrated embodiment need not have all the aspects or advantages shown.

An aspect or an advantage described in conjunction with a particular embodiment is not necessarily limited to that embodiment and may be practiced in any other embodiments, even if not so illustrated, or if not explicitly described. Also, reference throughout this specification to "some embodiments" or "other embodiments" means that a particular feature, structure, material, process, or characteristic described in connection with the embodiments is included in at least one embodiment. Thus, the appearances of the phrase "in some embodiments", "in one or more embodiments", or "in other embodiments" in various places throughout this specification are not necessarily referring to the same embodiment or embodiments.

The present invention is directed to an easy to assemble gearbox assembly. In accordance with some embodiments, the gearbox assembly comprises a plurality of inner gear rings and a plurality of gear groups configured to spin within the plurality of inner gear rings, which may comprise a helical gear ring and a spur gear ring, wherein the plurality of gear groups transfer power from an input end of the gearbox assembly to an output shaft at an output end of the gearbox assembly. A gear group may comprise a solar gear and a plurality of planetary gears, wherein the planetary gears mesh with the solar gear and the teeth of an inner gear ring. Power may be transferred between gear groups using a spinning frame attached to the planetary gears of one gear group and the solar gear of the next gear group. An output shaft may be connected to the gear group closest to the output end of the gearbox, and may pass through one or more bearings mounted in a bearing housing and be attached to a connector component for connecting the gearbox assembly to a final application, such as a fan, wheel, or gear.

A plurality of fixing members, such as threaded screws, may be used to fix the plurality of inner gear rings together, wherein the fixing members are inserted into the gearbox assembly from the input end, such that the connector component may be mounted to the output shaft prior to gearbox assembly without interfering with the insertion of the fixing members. The assembled gearbox may then be attached to an electric motor or other source of power.

Figure 2:
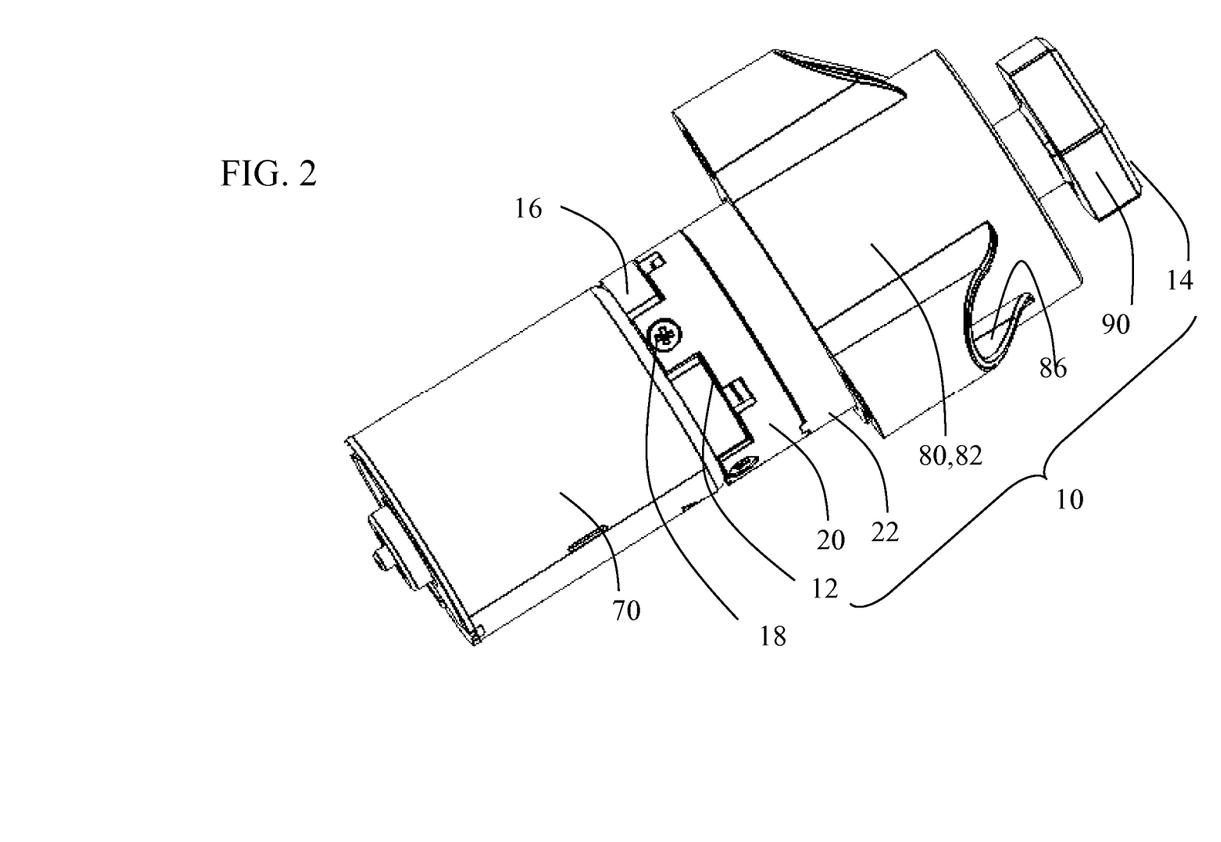
FIG. 2 illustrates an isometric view of an electric motor and gearbox assembly that may be used in some embodiments.
Figure 3:
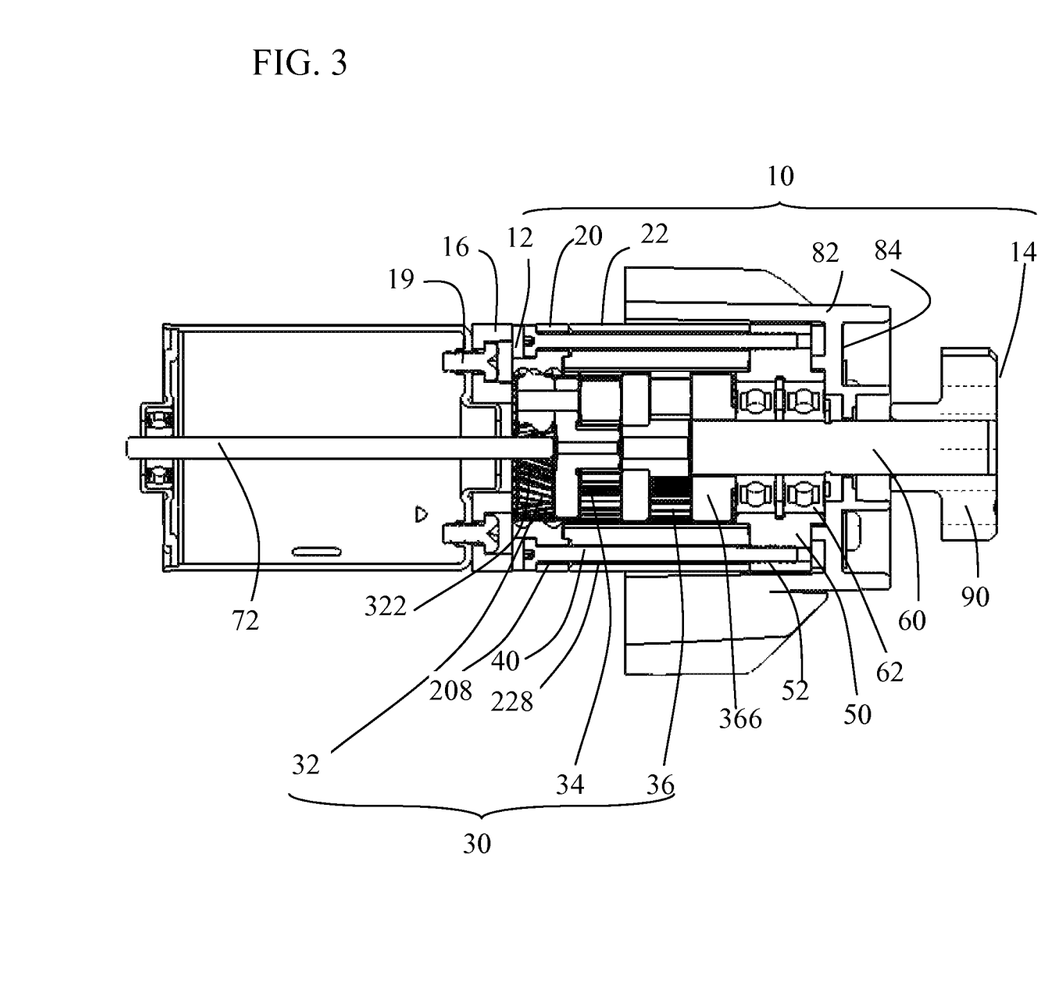
FIG. 3 illustrates a cross section of an electric motor and gearbox assembly in accordance with some embodiments.
Figure 4:
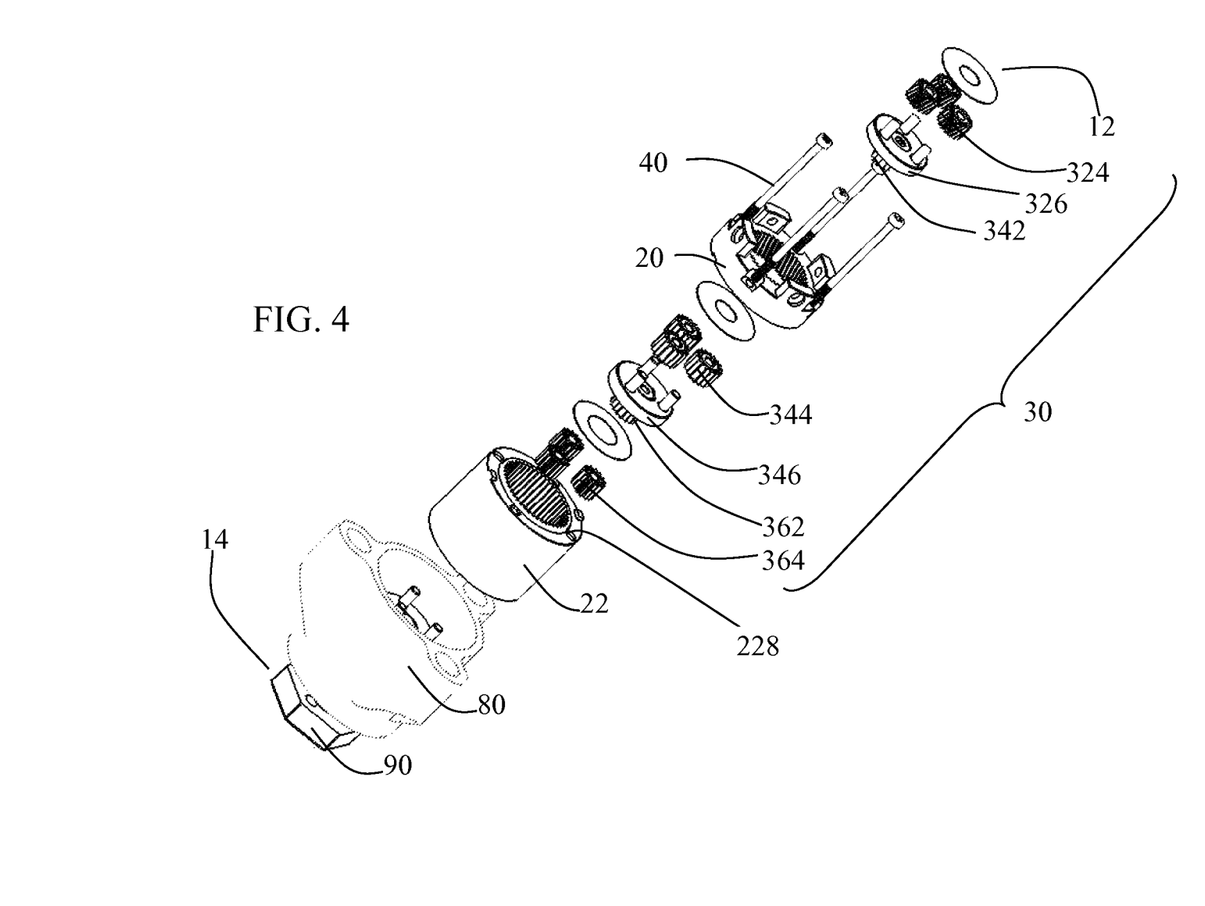
FIG. 4 illustrates an exploded view of a gearbox in accordance with some embodiments.

Various embodiments may be applied to any application that utilizes an electric motor. For example, FIGS. 2, 3, and 4 illustrate a motor with a gearbox assembly 10 in accordance with some embodiments. While the illustrated examples show a gearbox assembly 10 as attached to an electric motor 70, it is understood that a gearbox assembly in accordance with the present invention may be applied to any type of rotary device, including but not limited to an electric motor, an electric generator, a non-electric motor, etc.

The gearbox 10 comprises a first end 12 configured to receive power (e.g., from the electric motor 70), a second end 14 configured to output power (e.g., through an output shaft 60), and one or more inner gear rings 20 and 22 located between the first end 12 and the second end 14. For the purposes of the application, the first end 12 and the second end 14 may hereinafter be referred to as an input end and an output end, respectively.

In addition, gearbox 10 also comprises a plurality of gears 30 configured to spin within inner gear rings 20 and 22. One or more fixing mechanisms, components, members 40 may be used for fixing the inner gear rings 20 and 22 together. In accordance with some embodiments, the fixing components 40 may be inserted from the first end 12 of gearbox 10 through inner gear ring 20. Fixing components 40 may comprise bolts, threaded screws, or any other fastening means.

In accordance with some embodiments, the gears 30 comprise one or more gear groups, wherein a gear group comprises at least one solar gear and at least one planetary gear. For example, gears 30 may comprise a first gear group 32 located within the first inner gear ring 20, and second and third gear groups 34 and 36 located within the second inner gear ring 22.

Figure 5:
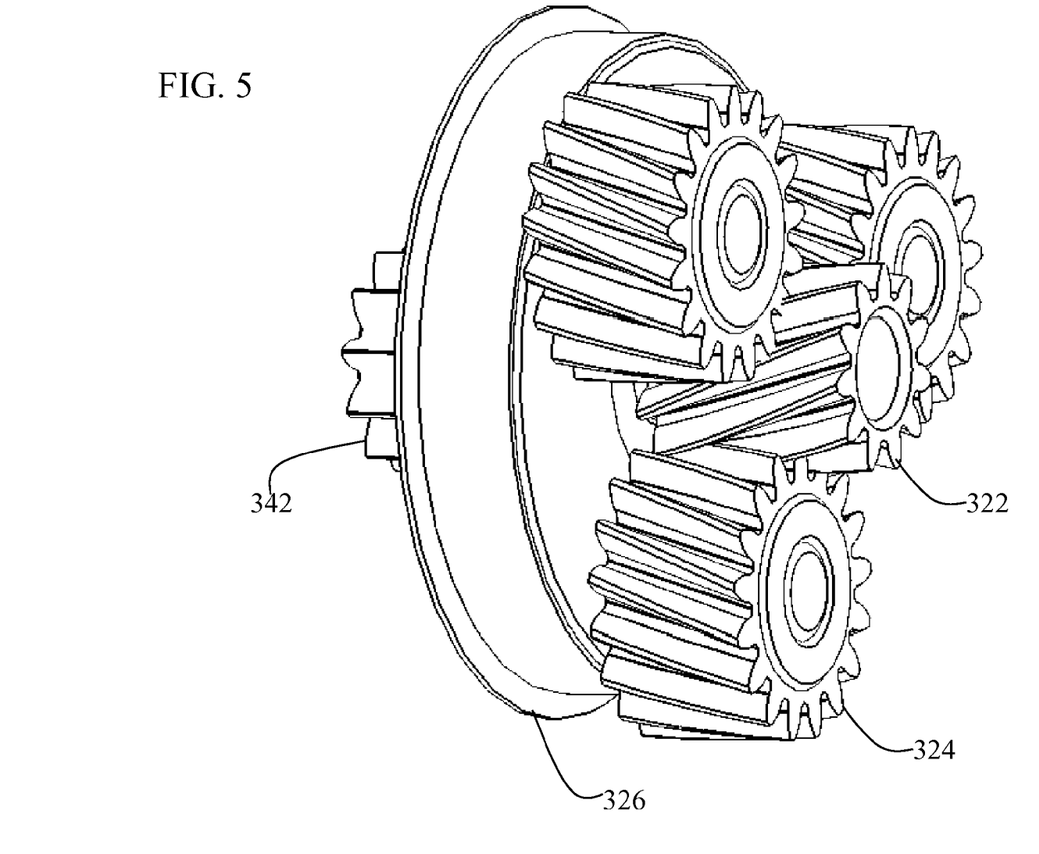
FIG. 5 illustrates a gear group in accordance with some embodiments.

First gear group 32, as illustrated in FIG. 5, may comprise a first solar gear 322, and a first planetary gear 324 that meshes with the first solar gear 322. First gear group 32 may also comprise a first spinning frame 326 mounted on one side of first planetary gear 324. In some embodiments, first planetary gear 324 is also configured to mesh with the teeth of first inner gear ring 20. First spinning frame 326 may be configured to be co-axial with the first solar gear 322.

Second gear group 34 may comprise a second solar gear 342, a second planetary gear 344 that meshes with second solar gear 342, and a second spinning frame 346 mounted on one side of second planetary gear 344. In some embodiments, second solar gear 342 is mounted on a side of first spinning frame 326 opposite to first planetary gear 324, such that first spinning frame 326 and second solar gear 342 rotate synchronously.

Third gear group 36 may comprise a third solar gear 362, a third planetary gear 364 that meshes with third solar gear 362, and a third spinning frame 366 mounted on one side of the third planetary gear 364. In accordance with some embodiments, third solar gear 362 is mounted on a side of second spinning frame 346 opposite to second planetary gear 344, such that second spinning frame 346 and third solar gear 362 rotate synchronously. In some embodiments, second and third planetary gears 344 and 364 also mesh with the teeth of second inner gear ring 22. In the illustrated embodiments, each gear group 32, 34, or 36 comprises one solar gear, three planetary gears, and a spinning frame attached to the three planetary gears, although it will be understood that other configurations of solar and planetary gears may also be used.

It will be understood by those skilled in the art that although the illustrated embodiments comprise two inner gear rings and three gear groups, the invention may be applied to any gearbox with one or more inner gear rings and one or more gear groups, wherein the number of gear groups is greater than or equal to the number of inner gear rings.

In some embodiments, the gears of first gear group 32 are helical gears. In other words, the teeth of first solar gear 322 and first planetary gear 324 are helical teeth. Accordingly, the inner teeth of first inner gear ring 20 may also be helical teeth, so that the teeth of the first planetary gear 324 are able to mesh with the inner teeth of inner gear ring 20.

In some embodiments, an inclination angle of the helical teeth may be selected to be between 8 degrees (°) and 20°. In some embodiments, the angle is configured to be approximately 16°. The use of helical gears allows for a higher degree of overlap between the gear teeth of planetary gear 324 and gear ring 20. By making the engagement between the teeth of the gear ring 20 and planetary gear 324 more gradual, the noise produced by the gears during operation of the motor and gearbox may be reduced. In some embodiments, first solar gear 322 may be made of steel, the first planetary gear 324 may comprise a plastic material, while the first inner gear ring 20 may be formed through powder metallurgy, thereby ensuring mechanical strength while reducing gear noise.

In some embodiments, the second and third gear groups 34 and 36 comprise spur gears. In order to maintain mechanical strength and to provide sufficient torque during operation, the second solar gear 342, second planetary gear 344, and second inner gear ring 22 may be formed using powder metallurgy.

Figure 6A:
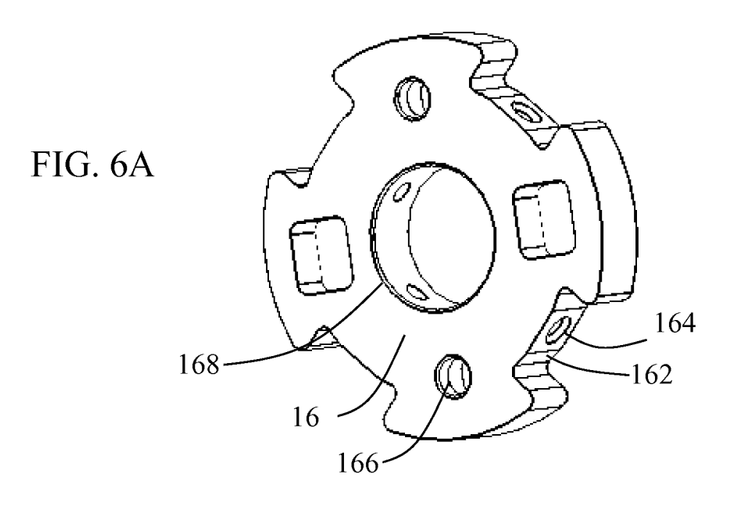
FIG. 6A illustrates a mounting plate in accordance with some embodiments.
Figure 6B:
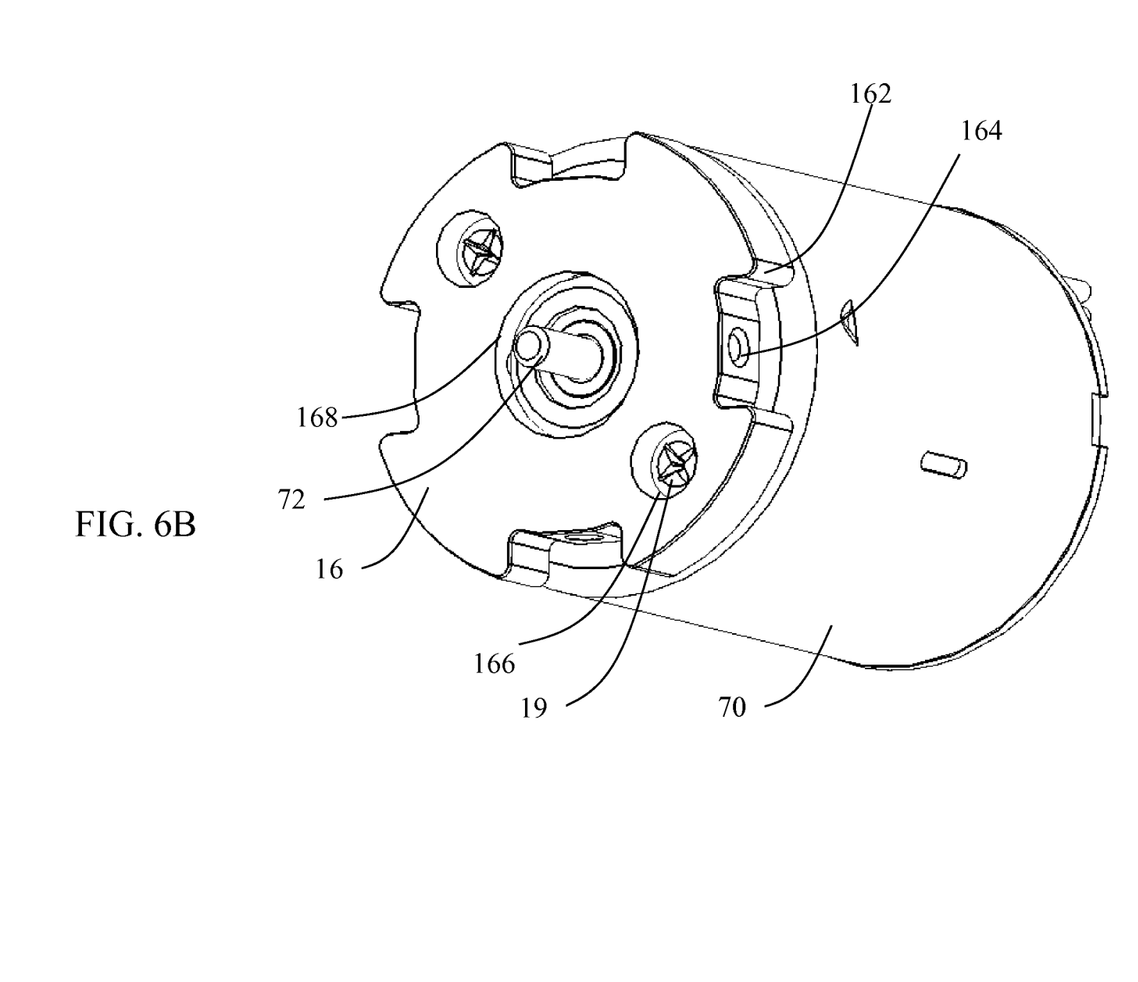
FIG. 6B illustrates a mounting plate in relation to an electric motor in accordance with some embodiments.

In accordance with some embodiments, a mounting plate 16 may be provided on the input end 12 of the gearbox 10. FIGS. 6A and 6B illustrate a mounting plate 16 as used in some embodiments. Mounting plate 16 may be attached to a motor 70 through one or more fasteners 19. Fasteners 19 may comprise bolts, screws, or any other fastening means. In some embodiments, fasteners 19 are positioned in an axial direction to connect mounting plate 16 to motor 70. For example, fasteners 19 may be axially inserted through holes or cavities 166 on mounting plate 16. In some embodiments, holes 166 may comprise a wider upper portion and narrower lower portion, wherein the wider upper portion is configured to accommodate a head portion of a fastener 19.

Mounting plate 16 also comprises a central through hole or cavity 168, configured to allow an output shaft 72 of motor 70 to pass through into the gearbox 10. The first solar gear 322 may be mechanically fixed to the output shaft 72, such that the first solar gear 322 and output shaft 72 are configured to spin or rotate together. Thus, power is transferred from the output shaft 72 of motor 70 to the first solar gear 322 of first gear group 32, and to the first planetary gear 324 and spinning frame 326. From there, the power is transferred to subsequent gear groups of the gearbox 10.

First inner gear ring 20 may be fixed to the mounting plate 16 through a plurality of fasteners 18 inserted in radial directions, hereinafter referred to as radial fasteners 18. The mounting plate 16 in accordance with some embodiments comprises a plurality of recesses 162, wherein each recess 162 contains a hole, cavity, or other structure 164 (hereinafter, collectively, hole) configured to receive an end of a radial fastener 18. For example, if radial fastener 18 is a threaded screw, a hole 164 may be a threaded hole configured to receive the end of a threaded screw 18.

Figure 7:
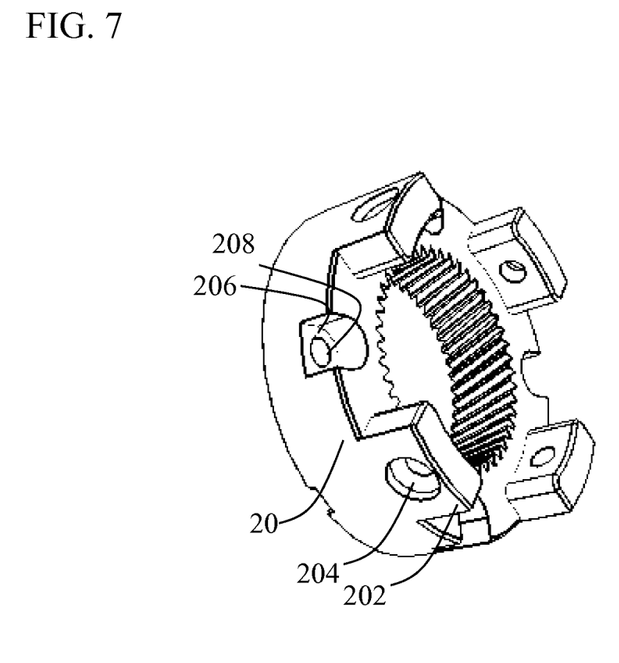
FIG. 7 illustrates an inner gear ring in accordance with some embodiments.
Figure 8:
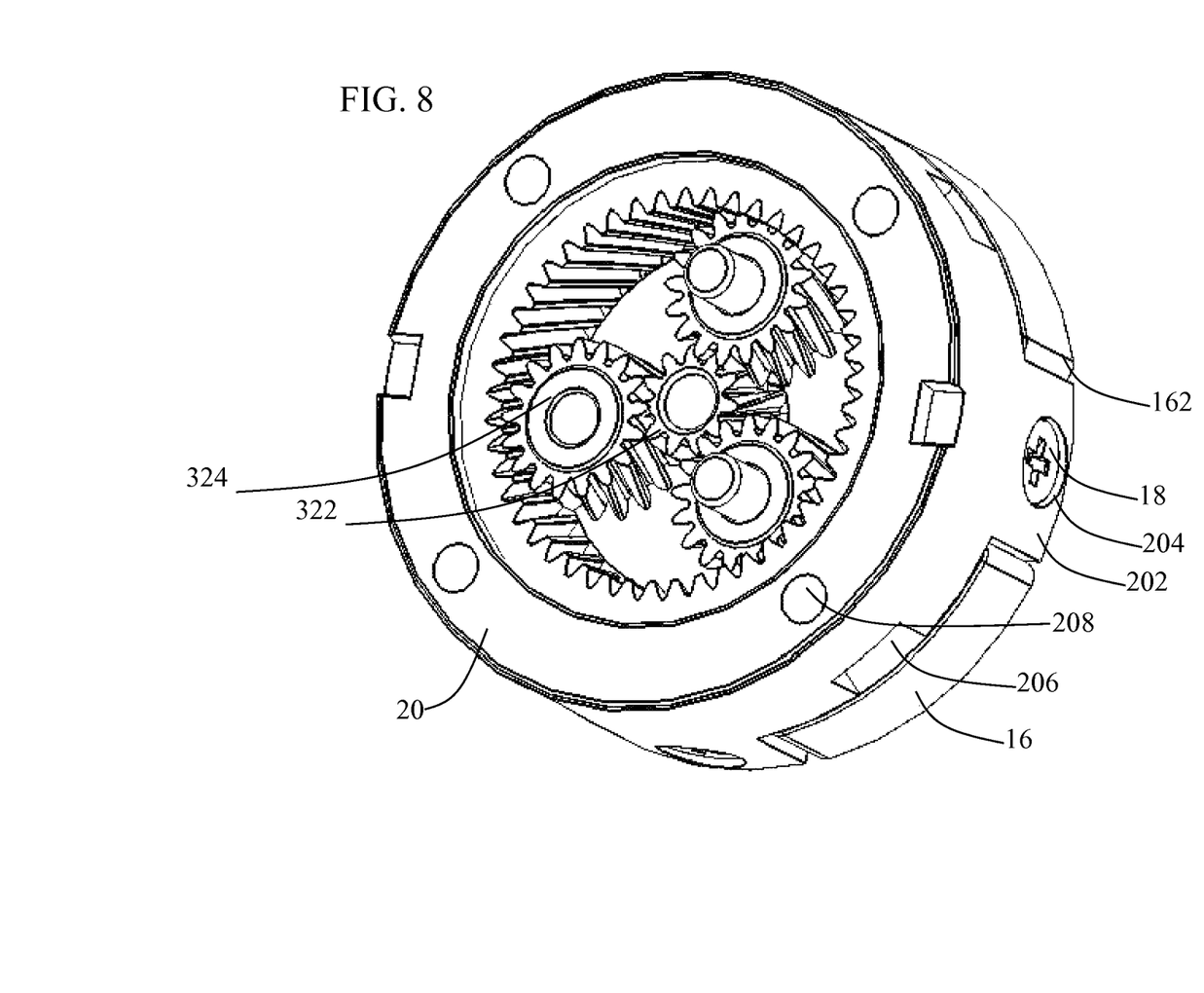
FIG. 8 illustrates an assembled mounting plate, inner gear ring, and gear group in accordance with some embodiments.

First inner gear ring 20, as illustrated in FIG. 7, may comprise a plurality of protrusions 202 extending in an axial direction. The extended protrusions 202 may be configured to correspond to a recess 162 on mounting plate 16, such that when first gear ring 20 and mounting plate 16 are attached, as illustrated in FIG. 8, each extended protrusion 202 fits into a respective recess 162. The extended protrusions 202 may contain a through hole or cavity 204 (hereinafter, hole) positioned radially to face a respective recess 162 of the mounting plate 16. This allows a radial fastener 18 to fix the first inner gear ring 20 to the mounting plate 16 by passing through hole 204 in an extended protrusion 202 of gear ring 20 to be received by a hole 164 in a respective recess 162 of mounting plate 16. In some embodiments, hole 204 may comprise a wider upper portion and narrower lower portion, wherein the wider upper portion is configured to accommodate a head portion of a radial fastener 18.

Gearbox 10 also comprises an output shaft 60. The output shaft 60 may be attached co-axially to the third spinning frame 366, so that the output shaft 60 rotates or spins with the third spinning frame 366. One end of the output shaft 60 is configured to pass through a bearing 62, sleeve, or any other component that provides mechanical coupling (e.g., a bearing surface) between moving and stationary parts to allow the end of output shaft 60 to extend outside the gearbox 10, thereby allowing the output from the motor 70 and gearbox 10 to be transferred directly or indirectly via a transmission mechanism to an external application, such as an impeller, axle, pulley, or gear, etc. The bearings 62 may be mounted on a bearing housing 50. In accordance with some embodiments, bearing 62 comprises a pair of ball bearings mounted to bearing housing 50.

In some embodiments, the first inner gear ring 20, second inner gear ring 22, and bearing housing 50 form the housing of the gearbox 10, and are held together by the fixing components 40, which extends in the axial direction of the output shaft 60.

In accordance with some embodiments, a fixing component 40 is a threaded screw having a head portion on one end with a diameter larger than a diameter of the rest of the screw, which may be referred as a tail portion of the fixing component 40, and a plurality of threads on the end of the screw opposite from the head portion. Bearing housing 50 may have one or more structures 52 (e.g., threaded holes) configured to receive an end of a respective fixing component 40.

In accordance with some embodiments, the side of first inner great ring 20 facing the mounting plate 16 has a plurality of concave recesses 206 spaced circumferentially from each other. The concave recesses 206 may be provided with axially oriented through holes or cavities 208 formed in the bottoms thereof. The width of recesses 206 are configured to be larger than the diameter of through holes 208, forming a step or indentation, such that when installing a fixing component 40 through a through hole 208, the head portion of the fixing component 40 may be accommodated in the recess 206, allowing the inner gear ring 20 and mounting plate 16 to be in close contact with each other when assembled, thereby reducing the axial length of the whole assembly. Thus, the fixing components 40 may be inserted from the input end 12 of the gearbox 10 (e.g., at first inner gear ring 20) and extend to the output end 14 (e.g., to bearing housing 50).

Figure 9:
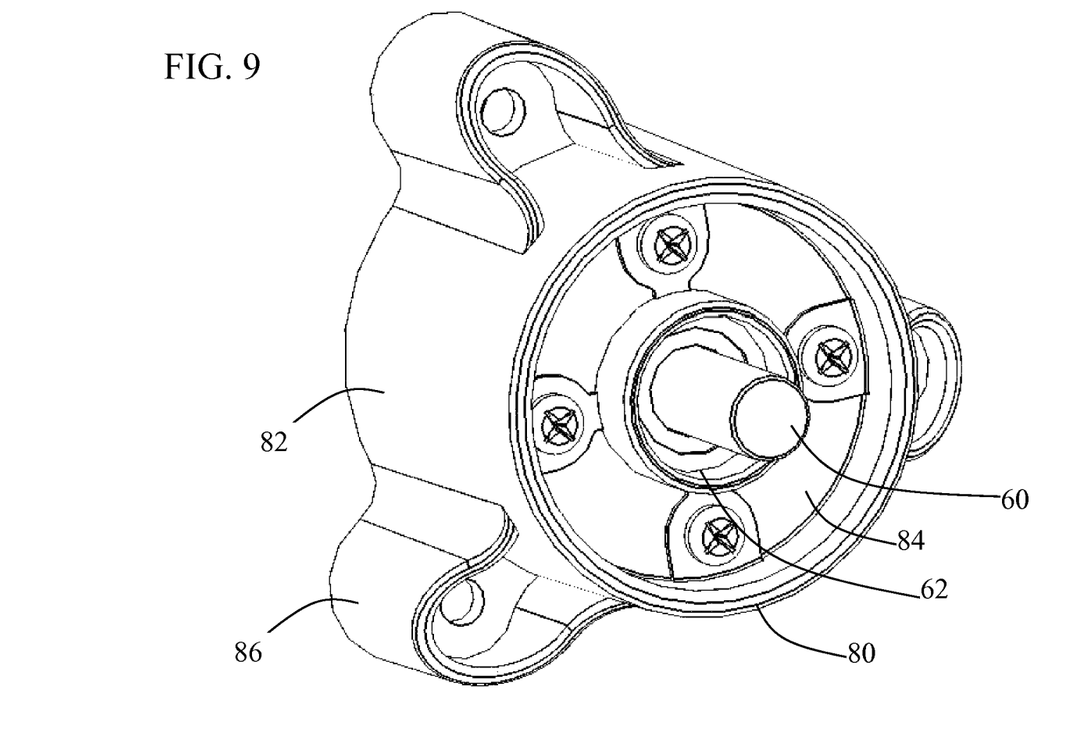
FIG. 9 illustrates an exterior sleeve in accordance with some embodiments.

In accordance with some embodiments, gearbox 10 may further comprise a mounting frame or sleeve 80 (hereinafter collectively, sleeve), illustrated in FIG. 9. In some embodiments, the sleeve 80 may comprise a substantially cylindrical wall portion 82, a substantially circular end portion 84. The cylindrical wall portion 82 is configured to fit over the second inner gear ring 22 and bearing housing 50. The end portion 84 of the sleeve 80 may be fixed to bearing housing 50 through one or more fasteners. The center of end portion 84 may comprise a through hole allowing output shaft 60 to pass through.

The outside of wall portion 82 of the sleeve 80 may contain a plurality of mounting structures 86, which may include holes, loops, or other mechanisms for mounting the gearbox 10 to a frame or structure associated with a load or application, such as a fan, wheel, blade, etc. In some embodiments, the bearing housing 50 may be an integral part of the sleeve 80. For example, the bearing housing 50 may be in some embodiments formed integrally within the sleeve 80.

In order to facilitate the transfer of torque from output shaft 60 to an application or load (e.g., turning a wheel, gear, fan blade, etc.), the output shaft 60 may be connected to a connector 90. When assembled, the connector 90 is configured to be fixed to the end of output shaft 60 extending outside the body of gearbox 10. The diameter of the surface of the connector 90 perpendicular to the axis of the output shaft 60 may be configured to be larger than the diameter of the output shaft 60, thus increasing the potential contact area between the connector 90 and an application or load, and resulting in higher torque transfer capability. In some embodiments, the surface of connector 90 may be substantially circular. In other embodiments, different shapes may also be used. For example, in the illustrated embodiment, the surface of connector 90 is substantially hexagonal. The connector 90 may have a radial dimension greater than the diameter of the inner gear rings 20 and 22.

It is understood that in some embodiments, connector 90, instead of being a separate component from output shaft 60, may be integrally formed with output shaft 60.

In accordance with some embodiments, assembling gearbox 10 comprises first fixing connector 90 to an end of an output shaft 60. The output shaft 60 may then be placed through a bearing housing 50 and/or sleeve 80, and the other end the output shaft 60 is connected to the third spinning frame 366. Gears 30, which may be comprised of gear groups 32, 34, and 36, are placed in first and second inner gear rings 20 and 22, which may then be connected to bearing housing 50 using fixing mechanisms or components 40. Fixing mechanisms 40 may be configured to inserted from holes 208 of first inner gear ring 20, through hole 228 of second inner gear ring 22, and received by holes 52 of bearing housing 50.

Once the gearbox 10 is assembled, radial fasteners 18 may then be used to fix first inner gear ring 20 of the assembled gearbox 10 to a mounting plate 16 on a motor 70.

Because the connector 90 on output shaft 60 may be fixed in advance, or even be formed as part of output shaft 60, possible damage to bearing 62 from attaching the connector 90 to output shaft 60 after gearbox 10 is assembled may be avoided. Because fixing mechanism 40 may be inserted from the input side 12 of the gearbox 10 instead of output side 14, interference with connector 90 may be avoided. In addition, the configuration of fixing mechanism 40 allows for the components of gearbox 10 to be held together prior to attaching the gearbox 10 to motor 70.

In the foregoing specification, various aspects have been described with reference to specific embodiments thereof. It will, however, be evident that various modifications and changes may be made thereto without departing from the broader spirit and scope of various embodiments described herein. For example, the above-described systems or modules are described with reference to particular arrangements of components. Nonetheless, the ordering of or spatial relations among many of the described components may be changed without affecting the scope or operation or effectiveness of various embodiments described herein. In addition, although particular features have been shown and described, it will be understood that they are not intended to limit the scope of the claims or the scope of other embodiments, and it will be clear to those skilled in the art that various changes and modifications may be made without departing from the scope of various embodiments described herein. The specification and drawings are, accordingly, to be regarded in an illustrative or explanatory rather than restrictive sense. The described embodiments are thus intended to cover alternatives, modifications, and equivalents.

The invention claimed is:

1. A gearbox assembly having a power input end and a power output end, comprising:
   a plurality of inner gear rings;
   a plurality of gear groups rotably attached to the plurality of inner gear rings and mechanically coupled to each other to transfer torque between the power input end and the power output end; and
   a plurality of fixing members inserted from the power input end and extending axially through holes in each of the plurality of inner gear rings, so as to fix the plurality of inner gear rings together,
   wherein a first inner gear ring of the plurality of inner gear rings that is adjacent the power input end comprises a plurality of protrusions extending in an axial direction and configured to mate with a plurality of recesses associated with an electric motor, wherein the plurality of protrusions are monolithic with the first inner gear ring, and
   a plurality of fasteners extending radially through holes in each of the plurality of protrusion, such that the holes in each of the plurality of inner gear rings through which the plurality of fixing members axially extend are oriented perpendicular to the holes in each of the plurality of protrusions through which the plurality of fastener radially extend.

2. The gearbox assembly of claim 1, wherein a fixing member of the plurality of fixing members comprises a head portion adjacent the power input end and a tail portion adjacent the power output end.

3. The gearbox assembly of claim 2, wherein the fixing member comprises a threaded screw.

4. The gearbox assembly of claim 1, wherein a gear group of the plurality of gear groups comprises a solar gear and at least one planetary gear.

5. The gearbox assembly of claim 4, wherein the gear group further comprises a spinning frame coaxial with the solar gear, mechanically coupled to the at least one planetary gear, and rotably attached to a solar gear of another gear group of the plurality of gear groups.

6. The gearbox assembly of claim 1, wherein the plurality of inner gear rings comprise a helical gear ring and at least one spur gear ring.

7. The gearbox assembly of claim 6, wherein the helical gear ring is located at the power input end and comprises a recess configured to accommodate a head portion of a fixing member of the plurality of fixing members.

8. The gearbox assembly of claim 1, wherein the plurality of fasteners fix the first inner gear ring adjacent the power input end to the electric motor, wherein the plurality of fasteners extend radially through the holes in each of the plurality of protrusions, such that the plurality of fasteners each have a longitudinal axis that is oriented radially.

9. The gearbox assembly of claim 1, further comprising a sleeve enclosing a portion of the plurality of inner gear rings and having at least one mounting structure for mounting the gearbox assembly.

10. The gearbox assembly of claim 9, wherein the sleeve further comprises a bearing housing.

11. The gearbox assembly of claim 1, wherein:
    the plurality of inner gear rings comprises two inner gear rings; and the plurality of gear groups comprises three planetary gear groups.

12. A process for assembling a gearbox, comprising:
    attaching a connector onto a first end of an output shaft;
    mechanically coupling a second end of the output shaft to a plurality of gear groups configured to spin within a plurality of gear rings;
    mating a plurality of protrusions that extend in an axial direction of a first gear ring out of the plurality of gear rings that is remote from the connector with a plurality of recesses associated with an electric motor; and
    axially inserting a plurality of fixing members from an end remote from the connector into holes in each of the plurality of gear rings to fix together the plurality of gear rings,
    radially inserting a plurality of fasteners into holes in each of the plurality of protrusions to the first gear ring to the electric motor,
    wherein the plurality of protrusions are monolithic with the first gear ring, and
    wherein the holes in each of the plurality of gear rings are oriented perpendicular to the holes in each of the plurality of protrusions.

13. The process of claim 12, further comprising:
    mechanically coupling a solar gear in a first gear group of the plurality of gear groups remote from the connector to an shaft of the electric motor.

14. The process of claim 13, wherein the plurality of fasteners each have a longitudinal axis that is oriented radially.

15. The process of claim 13, wherein mechanically coupling the second end of the output shaft to the plurality of gear groups further comprises:
    mechanically coupling a solar gear in a second gear group of the plurality of gear groups to a planetary gear of the first gear group;
    mechanically coupling a solar gear of a third gear group of the plurality of gear groups to a planetary gear of the second gear group; and mechanically coupling the second end of the output shaft to a planetary gear of the third gear group.

16. The process of claim 15, wherein mechanically coupling the solar gear in the second gear group to the planetary gear of the first gear group further comprises:
attaching a spinning frame coaxial with the solar gear of the first gear group to the planetary gear of the first gear group; and
synchronizing a rotation of the solar gear of the second gear group with a rotation of the spinning frame.

17. The process of claim 12, wherein axially inserting the plurality of fixing members comprises screwing in the plurality of fixing members.

18. The process of claim 12, wherein mechanically coupling the second end of the output shaft to the a plurality of gear groups further comprises including a helical planetary gear group and spur planetary gear group in the plurality of gear groups.

\* \* \* \* \*